(12) United States Patent  
Macken et al.

(10) Patent No.: US 9,042,210 B2  
(45) Date of Patent: May 26, 2015

(54) MULTI-PURPOSE NEAR-FIELD TRANSDUCER HAVING A TEMPERATURE COEFFICIENT OF RESISTANCE

(71) Applicant: Seagate Technology LLC, Cupertino, CA (US)

(72) Inventors: Declan Macken, Prior Lake, MN (US); James Dillon Kiely, Edina, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/038,099

(22) Filed: Sep. 26, 2013

(65) Prior Publication Data

US 2015/0085630 A1 Mar. 26, 2015

(51) Int. Cl.
| | |
|---|---|
| G11B 11/00 | (2006.01) |
| G11B 21/21 | (2006.01) |
| G11B 13/08 | (2006.01) |
| G11B 5/48 | (2006.01) |

(52) U.S. Cl.  
CPC ............... *G11B 21/21* (2013.01); *G11B 13/08* (2013.01); *G11B 5/4866* (2013.01)

(58) Field of Classification Search  
None  
See application file for complete search history.

(56) References Cited

U.S. PATENT DOCUMENTS

| | | | |
|---|---|---|---|
| 8,149,653 B2 | 4/2012 | Shimazawa et al. | |
| 8,243,561 B2 | 8/2012 | Matsumoto | |
| 8,369,191 B2 | 2/2013 | Shimazawa | |
| 8,391,107 B2 | 3/2013 | Gage et al. | |
| 8,406,090 B2 | 3/2013 | Juang et al. | |
| 8,432,781 B2 | 4/2013 | Knappmann et al. | |
| 2009/0225464 A1 | 9/2009 | Juang et al. | |
| 2011/0216635 A1 | 9/2011 | Matsumoto | |
| 2011/0228651 A1 | 9/2011 | Gage et al. | |
| 2011/0228652 A1 | 9/2011 | Gage et al. | |
| 2011/0228653 A1 | 9/2011 | Shimazawa et al. | |
| 2012/0134246 A1 | 5/2012 | Shimazawa | |
| 2012/0163137 A1 | 6/2012 | Wang et al. | |
| 2012/0257488 A1 | 10/2012 | Knappmann et al. | |
| 2013/0107390 A1* | 5/2013 | Huang et al. ................. 360/31 |
| 2013/0107680 A1* | 5/2013 | Contreras et al. .......... 369/13.32 |
| 2013/0135975 A1 | 5/2013 | Gage et al. | |
| 2013/0170331 A1* | 7/2013 | Contreras et al. .......... 369/13.33 |
| 2013/0286805 A1* | 10/2013 | Macken et al. ............ 369/13.33 |
| 2013/0286807 A1* | 10/2013 | Gao et al. .................. 369/13.33 |
| 2014/0029396 A1* | 1/2014 | Rausch et al. ............. 369/13.23 |

* cited by examiner

*Primary Examiner* — Paul Huber  
(74) *Attorney, Agent, or Firm* — Hollingsworth Davis, LLC

(57) ABSTRACT

An apparatus includes a writer, an arrangement comprising a plasmonic near-field transducer (NFT) adjacent the writer and comprising a material having a temperature coefficient of resistance (TCR), and a lead arrangement connected to the NFT arrangement. In some configurations, the NFT arrangement includes a heat sink, and the lead arrangement is connected to the heat sink. In other configurations, the lead arrangement is connected directly to the NFT.

22 Claims, 8 Drawing Sheets

MULTI-PURPOSE NEAR-FIELD TRANSDUCER HAVING A TEMPERATURE COEFFICIENT OF RESISTANCE

SUMMARY

Embodiments of the disclosure are directed to an apparatus comprising a writer, an arrangement comprising a plasmonic near-field transducer (NFT) adjacent the writer and comprising a material having a temperature coefficient of resistance (TCR), and a lead arrangement connected to the NFT arrangement. In some embodiments, the NFT arrangement comprises a heat sink, and the lead arrangement is connected to the heat sink. In other embodiments, the lead arrangement is connected to the NFT.

According to other embodiments, an apparatus comprises a writer of a transducer configured to magnetically interact with a magnetic recording medium, an arrangement comprising a plasmonic NFT adjacent the writer and comprising a material having a temperature coefficient of resistance (TCR), and a lead arrangement connected to the NFT arrangement. In some implementations, a signal developed at the lead arrangement comprises a component that varies in relation to a change in spacing between a slider supporting the NFT arrangement and the medium. In other embodiments, a signal developed at the lead arrangement comprises a component that varies in relation to a change in optical power of light transmitted through an optical path between a light source and the NFT. In further embodiments, a signal developed at the lead arrangement comprises a component that varies in relation to a change in spacing between the slider supporting the NFT arrangement and the medium, and varies to a change in optical power of light transmitted through an optical path between a light source and the NFT.

In further embodiments, an apparatus comprises a slider, a writer on the slider, and a plasmonic NFT having a temperature coefficient of resistance (TCR) on the slider and adjacent to the writer. The NFT is configured to produce a signal indicative of temperature at the NFT.

In accordance with various embodiments, a method involves sensing a temperature at a slider using a plasmonic near-field transducer as a temperature sensor, and performing a predetermined action in response to the sensed temperature. In some embodiments, performing the predetermined action involves measuring a change in the sensed temperature indicative of a change in spacing between the slider and a magnetic recording medium. In other embodiments, performing the predetermined action involves measuring a change in the sensed temperature indicative of contact between the slider and a magnetic recording medium. In further embodiments, performing the predetermined action comprises measuring intensity of optical power of light transmitted through an optical path between a light source and the near-field transducer.

These and other features and aspects of various embodiments may be understood in view of the following detailed discussion and accompanying drawings.

DETAILED DESCRIPTION

Figure 1:
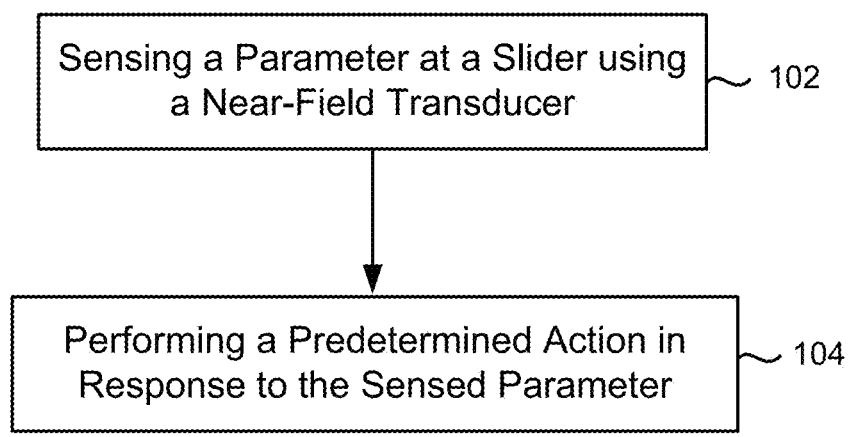
FIGS. 1-4 are flow charts illustrating various methods involving sensing a parameter at a slider using an NFT as a sensor in accordance with embodiments of the disclosure.

In the following description, reference is made to the accompanying set of drawings that form a part of the description hereof and in which are shown by way of illustration several specific embodiments. It is to be understood that other embodiments are contemplated and may be made without departing from the scope of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Data storage systems commonly include one or more recording heads that write and read information to and from a recording medium. A relatively small distance or spacing is maintained between a recording head and its associated media. This distance or spacing is known as "fly height" or "head-medium spacing." By reducing the head-medium spacing, a recording head is typically better able to both write and read data to and from a medium. Reducing the head-medium spacing also allows for surveying of recording medium topography, such as for detecting asperities, voids, and other features of the recording medium surface.

Head-medium contact detection and/or head-medium spacing sensing technologies are important for the performance and reliability of magnetic storage systems, particularly those that employ heat-assisted magnetic recording (HAMR). One challenge of implementing a HAMR system is to set clearance of the recording transducer without causing damage to the near-field transducer (NFT) of the transducer. The high sensitivity of NFT performance to head-medium spacing makes addressing this concern a significant priority.

The present disclosure relates to an apparatus and method for sensing changes in head-medium spacing and/or detecting head-medium contact using a near-field transducer (NFT) of a magnetic writer as a sensor. Embodiments of the disclosure are directed to sensing temperature at a slider that supports a magnetic writer using an NFT. Embodiments are directed to sensing temperature at or near an air bearing surface of a slider that supports a magnetic writer using an NFT. Some embodiments are directed to sensing changes in head-medium spacing using an NFT of a slider. Other embodiments are directed to sensing head-medium contact using an NFT of a slider. Further embodiments are directed to sensing changes in optical power of light transmitted by a light source to an NFT of a slider. Various embodiments are directed to a combination of two or more of these and other capabilities realized by utilizing a multi-purpose NFT of the disclosure. These and other embodiments are more fully described in the following discussion.

According to various embodiments, an NFT of a slider is used as a sensor for sensing one or more parameters at or near the slider, such as: temperature at the NFT, the slider or air bearing surface of the slider; changes in temperature at the NFT, slider or air bearing surface of the slider; head-medium spacing; changes in head-medium spacing; head-medium contact, and changes in optical power of light delivered to the NFT.

Embodiments of the disclosure employ a multi-purpose NFT for both heat-assisted magnetic recording (HAMR) and as a sensor for sensing one or more parameters at or near a slider that supports the NFT. A HAMR device can utilize an NFT during magnetic recording media (e.g., to a hard disk) in order to overcome superparamagnetic effects that limit the areal data density of typical magnetic media. When recording data on a HAMR medium, a small portion of the medium can be locally heated while being written to by a magnetic writer. A coherent light source such as a laser, e.g., laser diode, can provide the energy to create hot spots, and optical components built into a slider that supports the writer can be configured to direct this energy onto the recording medium.

When applying light to a HAMR medium, light from the light source can be concentrated into a small hotspot over the track where writing is taking place. As a result of what is known as the diffraction limit, optical components cannot be used to focus light to a dimension that is less than about half the wavelength of the light. For example, the lasers used in some HAMR designs produce light with wavelengths on the order of 800-900 nm, yet the desired hot spot can be on the order of 50 nm or less. Thus, the desired hot spot size can be well below half the wavelength of the light, and, due to diffraction, optical focusers cannot be used to obtain the desired hot spot size. As a result, an optical near-field transducer can be employed to create these small hotspots on the medium.

An NFT is a near-field optics device designed to reach local surface plasmon conditions at a designed wavelength of incident light. Representative NFT transducers may include a plasmonic optical antenna or a metallic aperture and a focusing element. The focusing element concentrates light on the transducer region (e.g., at the focal region) near where the optical antenna or a metallic aperture is located. Representative focusing elements may include solid immersion lenses (SIL), solid immersion mirrors (SIM), and/or three-dimensional channel waveguide for light delivery to an NFT. It is noted that some NFTs exclude one or both of a SIL and SIM. The NFT is designed to achieve surface plasmon resonance in response to this concentration of light.

Surface plasmons are collective oscillations of surface charges that are confined to an interface between a dielectric and a metal. When surface plasmons are resonantly excited by an external optical field, the field amplitude in the vicinity of the surface may be orders of magnitude greater than that of the incident field. Moreover, the region of enhanced field may be tightly confined to a spot much smaller than the incident wavelength. At resonance, a high electric field surrounds the NFT due to the collective oscillations of electrons at the metal surface. Part of this field will tunnel into a storage medium and get absorbed, thereby raising the temperature of a spot on the media as it being recorded.

An NFT may be located near an air bearing surface (ABS) of a slider used for interacting with a magnetic recoding medium, and may be placed in close proximity to a writer that is also part of the slider. This co-location of the NFT with the writer facilitates heating the hot spot during write operations. The focusing element, e.g., waveguide, and NFT may be formed as an integral part of the slider that supports the writer. Other optical elements, such as couplers, mirrors, prisms, etc., may also be formed integral to the slider.

Providing robust head-medium spacing and contact detection at the writer region of the slider can be challenging, particularly in conventional slider designs that employ thermal actuation of the writer and a spacing/contact sensor located remotely from the write pole. In general, it is difficult or impossible to place a spacing/contact sensor next to the write pole in a conventional design due to the complicated writer structure. Touchdown signals from a conventional contact sensor become even weaker for non-modulating or low-clearance air bearing designs.

Figure 2:
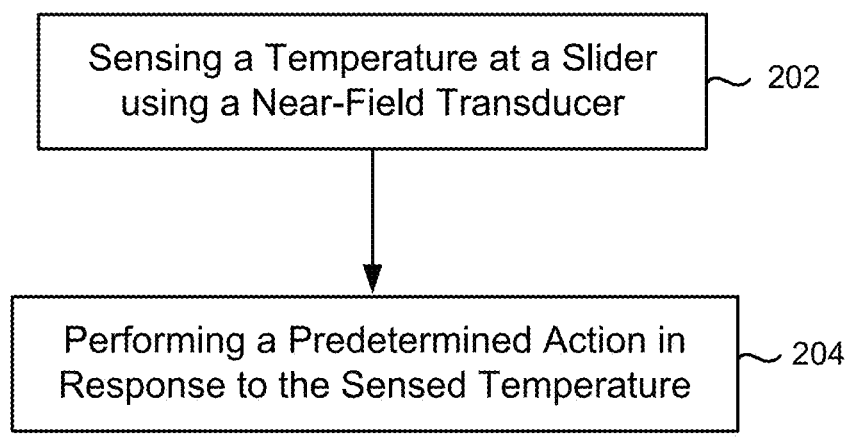

In accordance with various embodiments, and with reference to FIG. 1, methods of the disclosure involve sensing 102 a parameter at a slider using an NFT as a sensor, and performing 104 a predetermined action in response to the sensed parameter. According to the embodiment of FIG. 2, methods of the disclosure involve sensing 202 a temperature at a slider using an NFT as a temperature sensor, and performing 204 a predetermined action in response to the sensed temperature.

According to some embodiments, the operating temperature of an NFT is monitored for changes that may indicate a change in NFT performance over time (e.g., over the service life of the NFT). Due to various factors such as process and material variation, not all like-designed NFTs perform the same. During its service life, the ability for an NFT to generate plasmons and transfer energy to the media changes. These variations can be expressed as a change in the operating temperature of the NFT. A temperature profile of the NFT can be established at the time of manufacture by making temperature measurements using the NFT as a thermal sensor. During the service life of the NFT, temperature measurements can be taken using the NFT as a thermal sensor, and these measurements can be compared to the NFT temperature profile to determine if a shift in NFT operating temperature has occurred.

By way of example, if a current NFT temperature measurement deviates from the previously established NFT temperature profile by a predetermined threshold, (e.g., a deviation of at least about 1 or 2%), this deviation can be reported to the data storage system controller (or other controller) as a signal indicative of the detected temperature deviation. If warranted, a corrective action can be taken, such as adjusting the power supplied to the NFT. Assuming the magnitude of the NFT temperature deviation does not warrant servicing of the system in which the NFT is installed, for example, the NFT temperature profile can be updated using the current NFT temperature measurement. Using the NFT as a temperature sensor provides for the ability to detect part-to-part variation in the coupling efficiency of NFTs and changes in coupling efficiency during operation.

Figure 3:
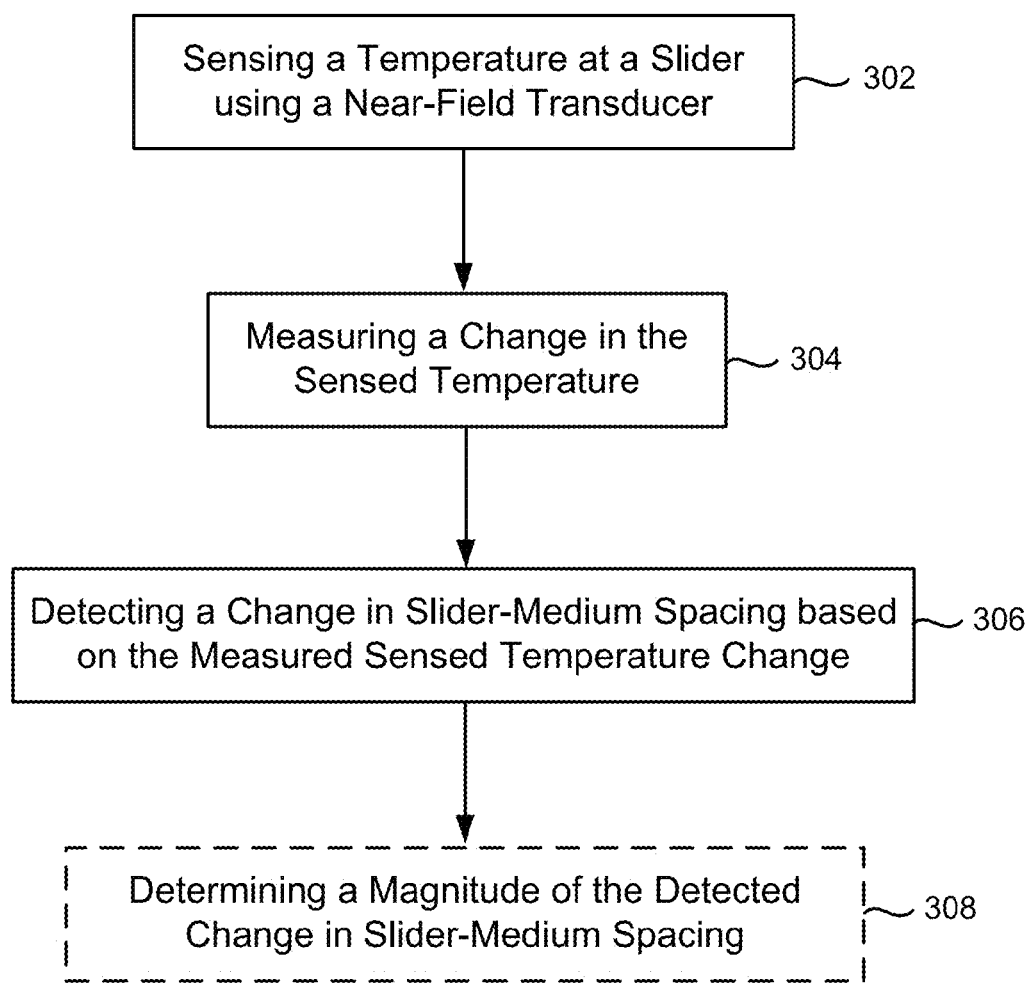
Figure 4:
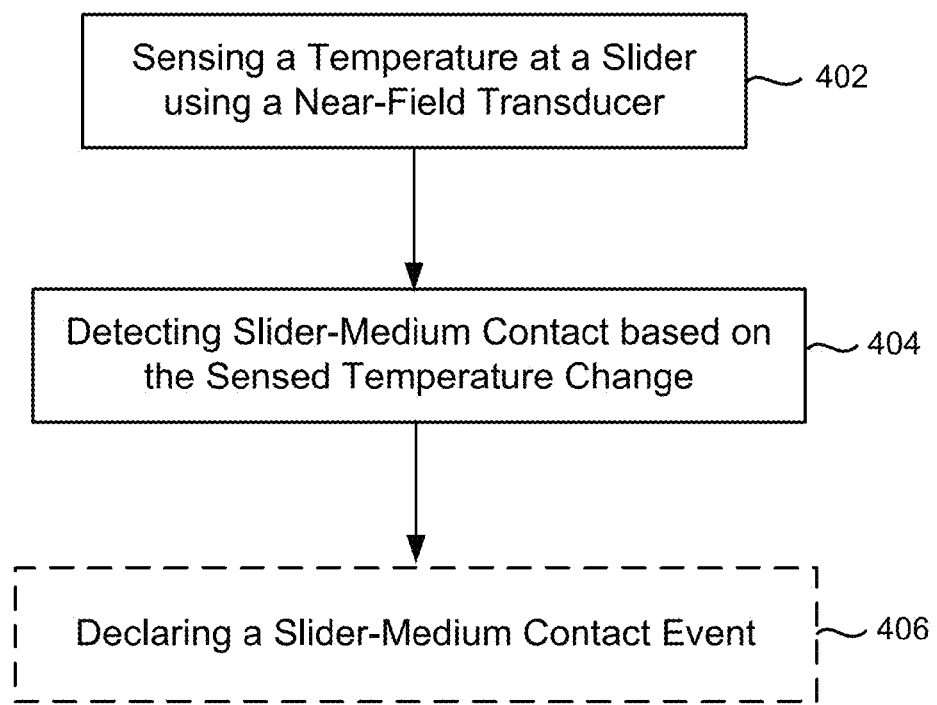

In accordance with the embodiment of FIG. 3, methods of the disclosure involve sensing 302 a temperature at a slider using an NFT as a temperature sensor, and measuring 304 a change in the sensed temperature. Methods of the disclosure also involve detecting 306 a change in slider-medium spacing based on the measured sensed change in temperature. Methods may optionally involve determining 308 a magnitude of the detected change in slider-medium spacing. According to further embodiments, and with reference to FIG. 4, methods of the disclosure involve sensing 402 a temperature at a slider using an NFT as a temperature sensor, and detecting 404 slider-medium contact based on the sensed change in temperature. Methods may optionally involve declaring a slider-medium contact event in response to the detected slider-medium contact.

According to various embodiments of the disclosure, an apparatus includes a slider, a writer on the slider, and a plasmonic near-field transducer having a temperature coefficient of resistance (TCR) adjacent the writer. The near-field transducer is configured to produce a signal indicative of temperature at the near-field transducer. Some embodiments are directed to an apparatus that includes a writer of a transducer configured to magnetically interact with a magnetic recording medium, a plasmonic near-field transducer adjacent the writer and comprising a material having a temperature coefficient of resistance, and a lead arrangement connected to the near-field transducer or a heat sink of the NFT. A signal developed at the lead arrangement comprises a component that varies in relation to a change in spacing between the NFT and the medium, and/or a component that varies in relation to a change in optical power of light transmitted between a light source and the NFT. The signal developed at the lead arrangement, for example, can comprise a component that changes in response to contact between the transducer and the medium. Other embodiments are directed to an apparatus that includes a writer, a plasmonic near-field transducer adjacent the writer and comprising a material having a TCR, and a lead arrangement connected to the TCR material of the near-field transducer. The lead arrangement may include leads having a low, near-zero or zero TCR.

Figure 5:
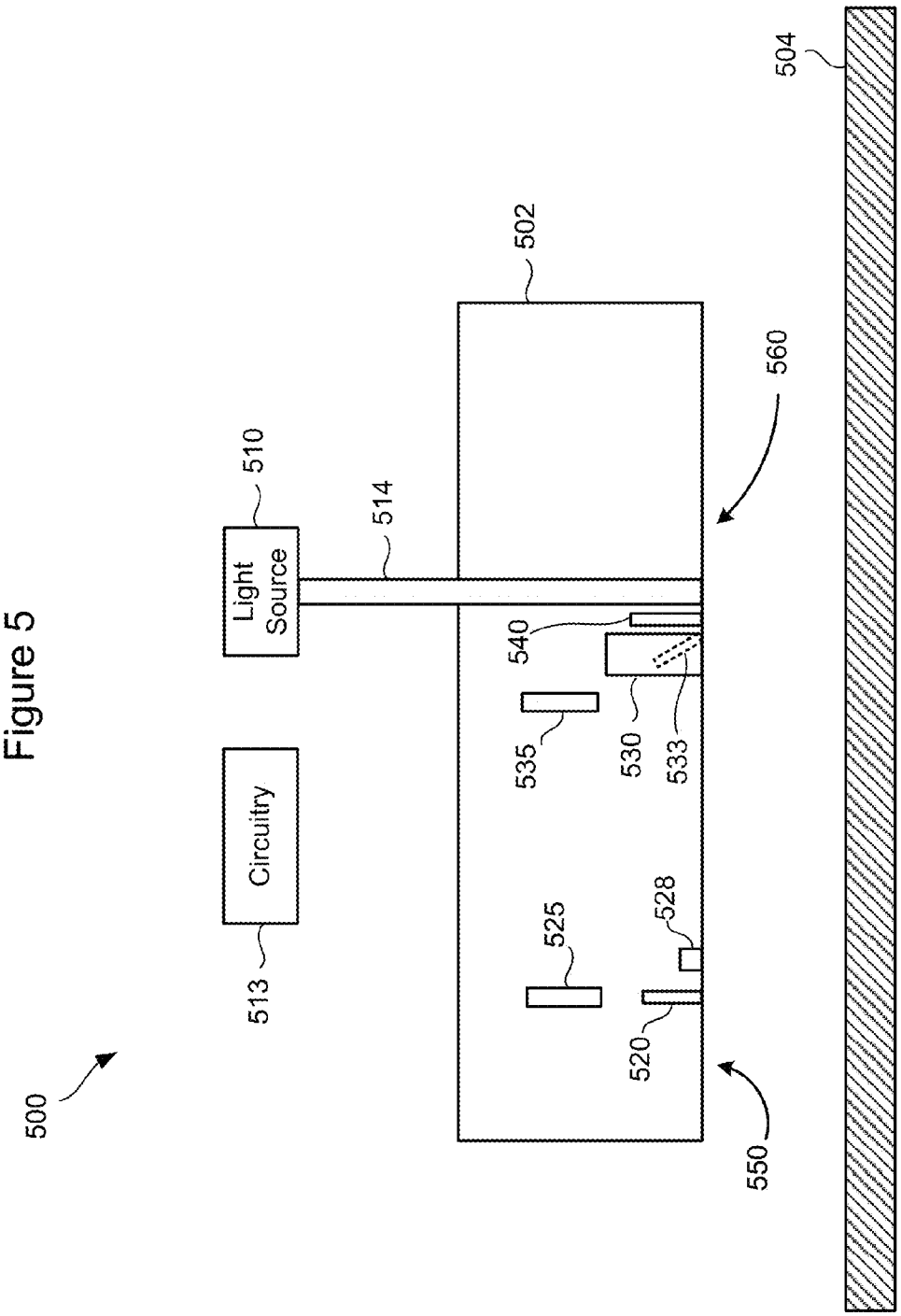
FIGS. 5 and 6 are illustrations of recording transducers that incorporate a multi-purpose NFT in accordance with various embodiments.

In accordance with various embodiments, and with reference to FIG. 5, a recording transducer arrangement 500 includes a recording transducer 502 comprising a slider 550 positioned proximate a rotating magnetic medium 504. The magnetic medium 504 is configured for reading and/or writing data with recording transducer 502. The surface of recording transducer 502 facing magnetic medium 504 includes an air bearing surface (ABS) 560. The recording transducer arrangement 500 includes a number of components, including a writer 530, a writer heater 535 thermally coupled to the writer 530, a reader 520, and a reader heater 525 thermally coupled to the reader 520. The writer 530 and reader 520 are positioned at or near an air bearing surface (ABS) 560 of the transducer 502. The heaters 525 and 535 may be resistive heaters that generate heat in response to passage of electrical current.

The thermal energy generated by the heaters 525 and 535 causes thermal expansion of the transducer 502, largely expressed at the ABS 560. In particular, actuation of the writer heater 535 causes thermal expansion of the writer region of the transducer 502, resulting in reduced spacing between the writer 530 and the magnetic recording medium 504. Similarly, actuation of the reader heater 525 causes thermal expansion of the reader region of the transducer 502, resulting in reduced spacing between the reader 520 and the magnetic recording medium 504. Selectively actuating the writer and reader heaters 525 and 535 allows for control of the head-medium spacing in a data storage system. For example, circuitry 513 can be configured to adjust the power supplied to heaters 525, 535 and to the light source 510. Power supplied to writer heater 535 can be adjusted when the NFT 540 and/or writer 530 is activated to adjust the spacing between the ABS 560 and the magnetic recording medium 504.

The writer 530 includes a write pole 533 and is configured for heat assisted magnetic recording. The write pole 530 of the writer 530 is located adjacent an NFT 540. The NFT 540 is energized by light communicated from a light source 510 via a waveguide 514. The light source 510 may include a laser diode, for example. The light source 510 can be mounted external, or integral, to the recording transducer 502.

In accordance with embodiments of the disclosure, the NFT 540 is implemented as a multi-purpose component, serving as both a heat source for effecting heat-assisted magnetic recording and as a sensor. According to various embodiments, the NFT 540 serves as a head-medium spacing sensor. In various embodiments, the NFT 540 serves as a head-medium contact sensor. In other embodiments, the NFT 540 serves as a temperature sensor. According to some embodiments, the NFT 540 serves as a light source power sensor.

In some embodiments, the NFT 540 serves as a combination of two or all of a head-medium spacing sensor, a head-medium contact sensor, a temperature sensor, and a light source power sensor. Implementing a multi-purpose NFT 540 according to embodiments of the disclosure provides for placement of a sensor in very close proximity to the write pole 533 (e.g., immediately adjacent the write pole 533 with no intervening component), allowing for sensing at the close point defined between the writer 530 and the magnetic recording medium 504 (i.e., the writer close point). Sensing at the writer close point also provides for sensing of changes in head-medium spacing and contact events at the writer region of the transducer 502.

According to some embodiments, a second sensor 528 may be positioned proximate the reader 520. Positioning a sensor, such as a thermal sensor, near the reader 520 allows for sensing at a close point defined between the reader 520 and the magnetic recording medium 504. Sensing at the reader close point provides for sensing of changes in head-medium spacing and contact events at the reader region of the transducer 502. It is understood that some embodiments of the transducer 502 incorporate sensing only at the writer region via the NFT 540, while other embodiments incorporate sensing at the writer and other locations of the transducer, such as the reader 520 and/or a location away from the ABS 560 (e.g., a reference sensor).

Although the sensor 528 (and other sensors of the transducer 502) can be implemented using different technologies, the sensor 528 is described herein as a resistance thermal sensors composed of materials having a temperature coefficient of resistance according to various embodiments. Other types of thermal sensors can be employed, such as a varistor or a thermocouple, for example. One example of a TCR sensor is a dual-ended temperature coefficient of resistance sensor (DETCR), in which each end is coupled to a bias source (e.g., bond pad of the transducer). Another example of a TCR sensor is a ground-split (GS) temperature coefficient of resistance sensor, in which one end of the GSTCR is coupled to ground and the other is coupled to a bias source. A TCR sensor measures temperature change by measuring the change in resistance, or rate of change in resistance, across the sensor. The sensor 528 situated near or at the ABS 560 is configured to measure the temperature change at the ABS 560 induced by thermal condition changes from air pressure, clearance, head operation, and contact, among other changes.

According to various embodiments, the NFT 540 is formed from a metal that supports surface plasmons and which includes material having a TCR. For example, the entirety of the NFT 540 may be fabricated from TCR material that also supports surface plasmons (e.g., Au, Ag, Cu and alloys thereof). In some embodiments, the NFT 540 is connected to or includes a heat sink, which may also be fabricated to include TCR material. The TCR material of the NFT 540 may be the same or different from that used to fabricate the heat sink. For example, the NFT 540 can be fabricated from a plasmonic metal having a TCR, and the material used to form the heat sink can be fabricated from a plasmonic or non-plasmonic material that includes or excludes TCR material. In embodiments where one or both of the NFT 540 and heat sink are formed from a plasmonic metal having a TCR, this TCR material can have a lower TCR value than may typically be desired for a conventional thermal contact sensor (i.e., a thermal sensor spaced away from the writer) due to a higher signal-to-noise ratio resulting from very close proximity of the NFT 540 to the write pole 533.

According to various embodiments, the NFT 540 is configured to sense changes in heat flow for detecting head-medium spacing changes and contact with respect to the medium 504. In some embodiments, a lead arrangement can be fabricated into the slider 550 (see, e.g., FIGS. 6-8), with a pair of leads that connect to the NFT 540 or a heat sink coupled to the NFT 540 (see, e.g., FIG. 7). The pair of leads can extend through the slider body to respective contacts of the transducer 502, such as bond pads of the transducer 502 or other electrical terminations. The contacts at which the pair of leads terminate connect the lead arrangement to circuitry 513. Circuitry 513 includes sensing and/or detection circuitry configured to receive signals from the NFT 540. Circuitry 513 may also include bias circuitry for producing a bias or sense current that is communicated to the NFT 540 via the lead arrangement. Changes in the bias or sense current as detected by circuitry 513 are indicative of changes in NFT temperature resulting from corresponding changes in head-medium spacing and/or head-medium contact. Changes in the bias or sense current as detected by circuitry 513 can also be indicative of changes in NFT temperature during operation, which can be indicative of changes in NFT and/or light source power changes.

During write operations, the NFT 540 is energized by the light source 510, resulting in an appreciable increase in NFT temperature. Upon completing the writer operation, energy is removed from the light source 510, resulting in an appreciable decrease in NFT temperature. As such, the light source 510 is pulsed between ON and OFF states (e.g., a light source pulse frequency of about 100 MHz to about 10 GHz resulting in cycling of NFT temperature between high and low values (e.g., between about 50° C. and about 500° C.). A signal indicative of NFT temperature acquired at the NFT lead arrangement will thus oscillate between high and low values relative to a baseline value due to NFT temperature cycling between write and non-write (e.g., read) operations. This baseline value can be detected by the circuitry 513 as an average of one or both of the high and low values (e.g., peaks) of the NFT signal during temperature cycling (assuming head-medium spacing remains stable).

Assuming no change in head-medium spacing, for example, the baseline value experiences no meaningful change during write and non-write operations. In response to a change in head-medium spacing, however, this baseline value shifts in relation to the increase or decrease in head-medium spacing. The circuitry 513 can be configured to sense changes in this baseline signal value which corresponds to changes in head-medium spacing. A sharp change (e.g., spike) in the baseline value can be detected by the circuitry 513 as a head-medium contact event, such as by the baseline value signal exceeding a rate of change or magnitude threshold.

In cases where the writer heater 535 is actuated, heat produced by writer heater actuation may result in an increase in the NFT 540 temperature, the removal of which would result in a reduction in NFT temperature. It can be appreciated that the addition and removal of heat to/from the NFT 540 due to the writer heater 535 and other heat sources or sinks of the transducer 502 can influence the temperature sensed at the NFT 540. These and other non-spacing (i.e., head-medium spacing) related heat factors which might adversely affect the accuracy of NFT temperature sensing can be accounted for by the circuitry 513. For example, heat transfer models of the transducer 502 can be used to estimate the amount of heat that is added to or removed from the NFT 540 during various operations. Offset temperature values can be stored in a look-up table of the circuitry 513 based on the heat transfer models. Alternatively a heat transfer equation (s) can be stored in the circuitry 513 from which temperature offset values can be computed in real-time.

During a writing operation in which the writer 530 is thermally actuated by the writer heater 535, for example, the measured NFT temperature will be higher than its biased induced temperature due to added heat generated by the writer heater 535. In this case, the circuitry 513 can be configured to subtract an offset value to the temperature measured using the NFT 540. This offset value corresponds to the temperature rise in the NFT 540 due to added writer heater heat estimated by the heat transfer model or computed using the heat transfer equation (s). Upon deactivation of the writer heater 535, an offset value corresponding to the estimated reduction in NFT temperature resulting from writer heater deactivation can be added to the temperature measured using the NFT 540.

It is noted that the temperature rise of the NFT 540 during write operations can be very significant. For example, during write operations, the NFT 540 can reach as high as about 1000° C. by absorbing only 1 mW optical power (see, e.g., commonly owned US Patent Application Publication 2012/0314549, which is incorporated herein by reference). During non-writing transducer operation, for example, the NFT 540 can cool to a temperature within a range of about 20° C. to about 70° C. The approach of offsetting the measured NFT temperature by estimated amounts due to known heat sources and sinks during different phases of transducer operation may be applied to account for heat transfer effects of one or more components of the transducer 502 on NFT temperature measurements.

Depending on the phase of transducer and data storage system operation, the NFT 540 may be at a temperature higher than that of the medium 504 (in which case the medium 504 serves as a heat sink), at a temperature lower than that of the medium 504 (in which case the medium 504 serves as a heat source), or at about the same temperature. In any of these representative operating scenarios, the NFT 540 can be operated to sense for changes in a temperature difference between it and the medium 504 indicative of changes in head-medium spacing and/or head-medium contact.

In a scenario where the NFT 540 operates at a temperature higher (e.g., by at least about 10° C.) than that of the medium 504, a relatively low current can be caused to flow through the lead arrangement/NFT circuit and monitored (via circuitry 523) to detect temperature changes experience by the NFT 540. In a scenario where the NFT 540 operates at a temperature about the same (e.g., within about 10° C. of each other) as that of the medium 504, a relatively high current can be caused to flow through the lead arrangement/NFT circuit to heat the NFT 540 to a temperature (e.g., at least about 10° C.) higher than that of the medium 504 in order to reliably monitor and detect temperature changes experience by the NFT 540.

In a scenario where the NFT 540 operates at a temperature lower (e.g., by at least about 10° C.) than that of the medium 504, two representative approaches can be used. According one approach, a relatively low current can be caused to flow through the lead arrangement/NFT circuit and monitored (via circuitry 523) to detect temperature changes experience by the NFT 540. This approach assumes that a temperature difference (e.g., a difference of at least about 3° C.) exists between the NFT 540 and the medium 504. According to a second approach, the bias current supplied to the NFT 540 can be adjusted so that the NFT 540 heats up to a temperature above (e.g., by at least 10° C.) that of the medium 504. Because the NFT 540 is formed from (or is coupled to) TCR material, the resistance of the NFT 540 (or TCR material of or coupled to the NFT 540) changes as a function of temperature (i.e., by n % per ° C.). The change in NFT resistance can be measured as a change in current or voltage by the circuitry 513 coupled to the lead arrangement.

According to various embodiments, a multi-purpose NFT 540 is configured to serve as an NFT and as a resistance thermal sensor. A resistance thermal sensor is essentially a thermal sensitive resistor on a pole tip. A resistance thermal sensor measures the temperature change induced by all thermal condition changes from air pressure, clearance, and contact, among other changes. For the air bearing surface 560 of transducer 502 shown in FIG. 1, for example, transducer cooling efficiency improves with reduced clearance to the medium 504 due to an increase in thermal transport efficiency. Transducer cooling efficiency reaches a maximum when the transducer 502 contacts the medium 504 because the medium 504 provides an efficient thermal sink to the transducer 502.

When using the NFT 540 as a head-medium spacing/contact sensor, an air gap is defined between the heated medium-facing surface of the transducer 502 adjacent the NFT 540 and the relatively cool magnetic recording medium 504. The transducer 502, air gap, and magnetic recording medium 504 define one level of heat transfer rate. According to a representative example, the temperature profile of the transducer 502 can be represented as a steady state DC signal generated by the NFT 540. In some embodiments, the temperature profile of the transducer 502 can be represented as an AC signal generated by the NFT 540, such as in response to modulation of head-medium spacing for example.

When the transducer 502 is heated by the NFT 504 and/or other transducer heat sources (e.g., one or both of the thermal heaters 535, 525), the transducer surface temperature will increase in response to the generated heat. Depending on the operating phase of the NFT 504 and the data storage system, the transducer temperature may be higher than the temperature of the recording medium 504, as discussed above. In this scenario, the recording medium 504 acts as a heat sink. When the transducer 502 contacts the recording medium 504, the transducer surface temperature will drop due to a change in heat transfer rate resulting from the contact. The NFT 540 senses this drop of temperature or an excursion of temperature trajectory, allowing for detection of head-medium contact. The transducer surface temperature will thereafter increase due to thermal actuator heating and frictional heating, which will also be sensed by the NFT 540.

In the scenario where the temperature of the recording medium 504 is higher than the NFT 540 temperature, the medium 504 serves as a heat source. When the transducer 502 contacts the recording medium 504, the transducer surface temperature will increase due to a change in heat transfer rate resulting from the contact. The NFT 540 senses this increase of temperature or an excursion of temperature trajectory, allowing for detection of head-medium contact. The transducer surface temperature will thereafter further increase due to thermal actuator heating and frictional heating, which will also be sensed by the NFT 540.

Figure 6:
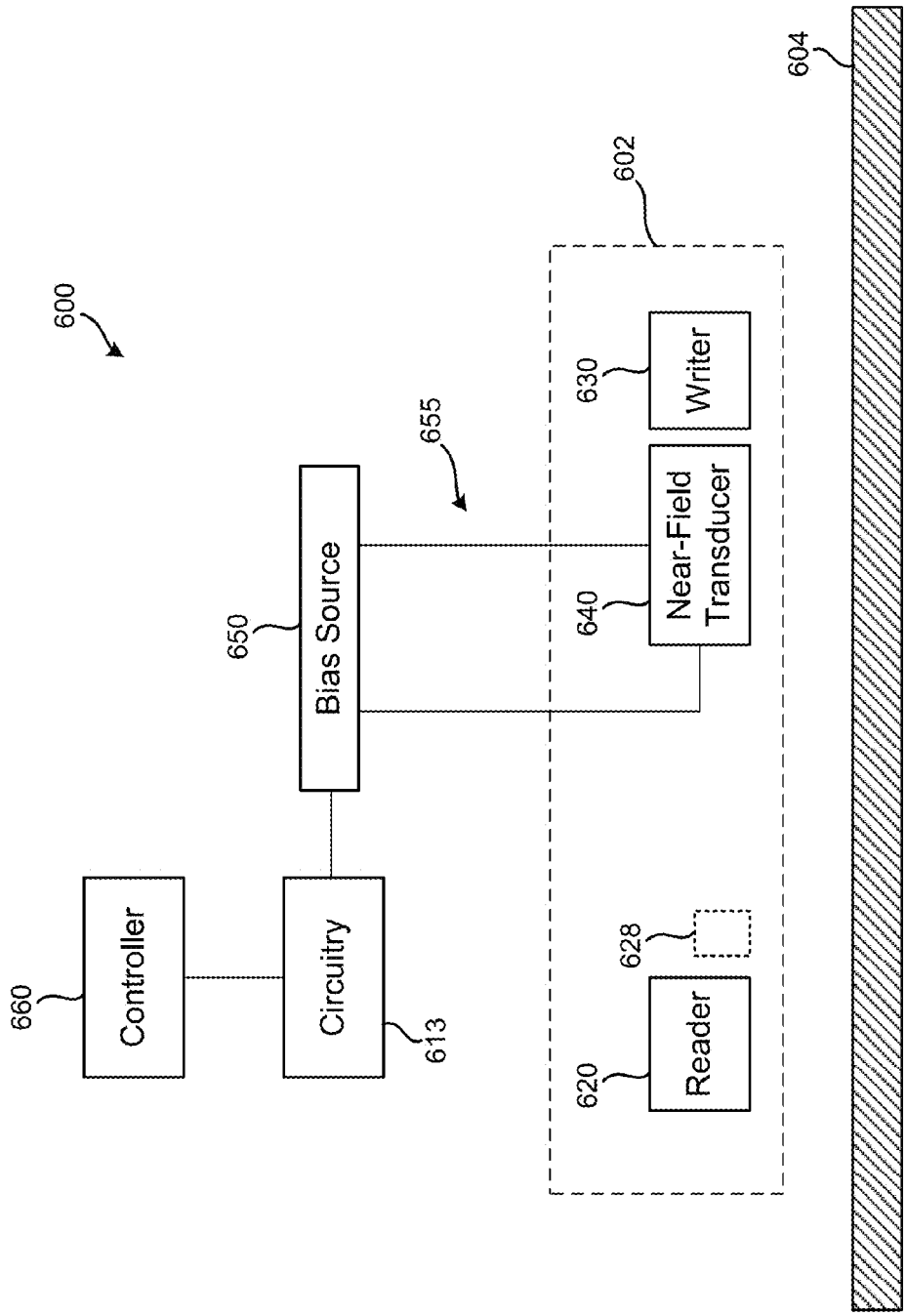

FIG. 6 illustrates various components of an apparatus 600 which incorporates a multi-purpose near-field transducer in accordance with various embodiments. The apparatus shown in FIG. 6 includes a recording transducer 602 which supports an NFT 640, a writer 630 positioned adjacent the NFT 640, a reader 620, and an optional thermal sensor 628 positioned adjacent the reader 620. A heater (not shown) may also be included for thermally actuating one or both of the writer 630 and reader 620. The NFT 640 is coupled to a bias source 650 via a lead arrangement 655. The lead arrangement 655 includes a pair of leads which are connected to the NFT 640, TCR material of the NFT 640 or a TCR heat sink connected to the NFT 640. The bias source 650 may be a current source (e.g., a DC current source), but may alternatively be a voltage source depending on the particulars of the design. The bias source 650 or a separate bias source can be coupled to the optional thermal sensor 628. Circuitry 613 is coupled to the bias source 650 and to the lead arrangement 655. Circuitry 613 may be coupled to a controller 660, such as a disk controller or other processor of the data storage system within which the apparatus 600 may reside.

Due to confined geometries at the write pole/NFT region, it is difficult to design leads that are large and do not contribute to the change in resistance experienced by the NFT TCR sensor. Use of low-, near zero-, or zero-TCR material in the leads overcomes this challenge. In accordance with various embodiments, the leads of the lead arrangement 655 are fabricated from a low-TCR, near zero-TCR, or zero-TCR material. Suitable materials include NiCu or NiCr. In some embodiments, two or more TCR materials having positive and negative TCR values can be combined to produce a lead having an effective TCR value that is near or substantially zero. Use of leads with low-, near zero-, or zero-TCR material in the lead arrangement 655 provides for increased temperature sensing accuracy since lead resistance changes due to temperature changes are due predominately or entirely to variations in NFT temperature, and not in the lead arrangement 655.

Figure 7:
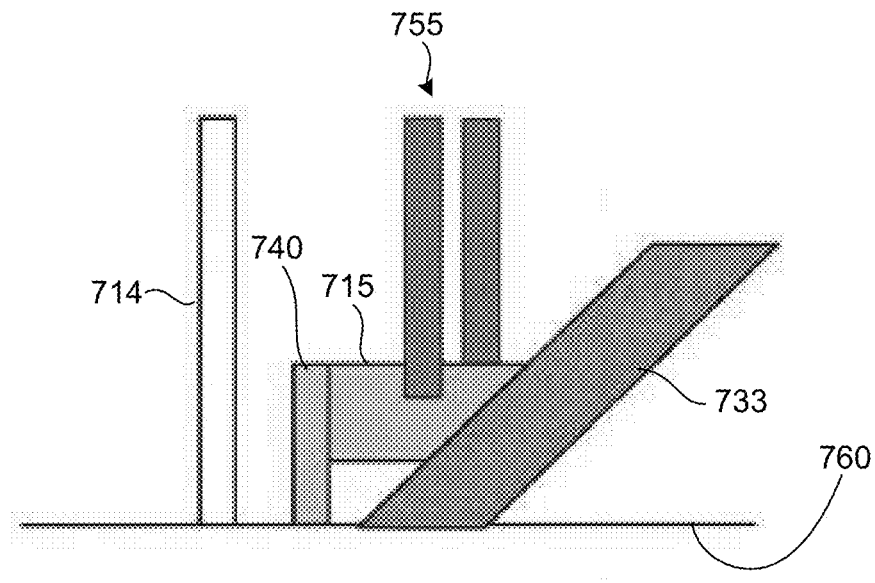
FIGS. 7-11 are illustrations of different configurations of a multi-purpose NFT in accordance with various embodiments.

FIGS. 7-11 illustrate different writer/NFT configurations in accordance with various embodiments. It is to be understood that the writer/NFT and NFT configurations shown in FIGS. 7-11 are for purposes of illustration, and do not limit the scope of the disclosure. FIG. 7 shows the writer/NFT region at the ABS 760 of a HAMR recording transducer in accordance with various embodiments. In FIG. 7, an NFT 740 is fabricated to include TCR material and positioned adjacent a write pole 733. A heat sink 715 thermally couples the NFT 740 to the write pole 733. A waveguide 714, which is optically coupled to a light source (not shown), is positioned adjacent the NFT 740. The NFT shown in FIG. 7 may be fabricated as a lollipop-type NFT having a circular cross-section.

With continued reference to FIG. 7, a lead arrangement 755, comprising a pair of leads, is coupled to the NFT 740 via a connection with the heat sink 715. As was discussed previously, the leads of the lead arrangement 755 can be formed from low-, near zero-, or zero-TCR material. The heat sink 715 may also be formed from low-, near zero-, or zero-TCR material, which may be the same or different from that of the lead arrangement 755.

In some embodiments, the heat sink 715 is fabricated from TCR material and serves as a thermal sensor, exclusive of or in addition to the NFT 740. For example, the NFT 740 may be fabricated from any plasmonic metal, and the heat sink 715 may be fabricated from a TCR material. In such an embodiment, the heat sink 715 may serve as a primary thermal sensor at the writer/NFT region of the transducer, while the NFT 740 contributes less than the heat sink 715 to the resistance change due to temperature changes occurring at the writer/NFT region of the transducer.

Figure 8:
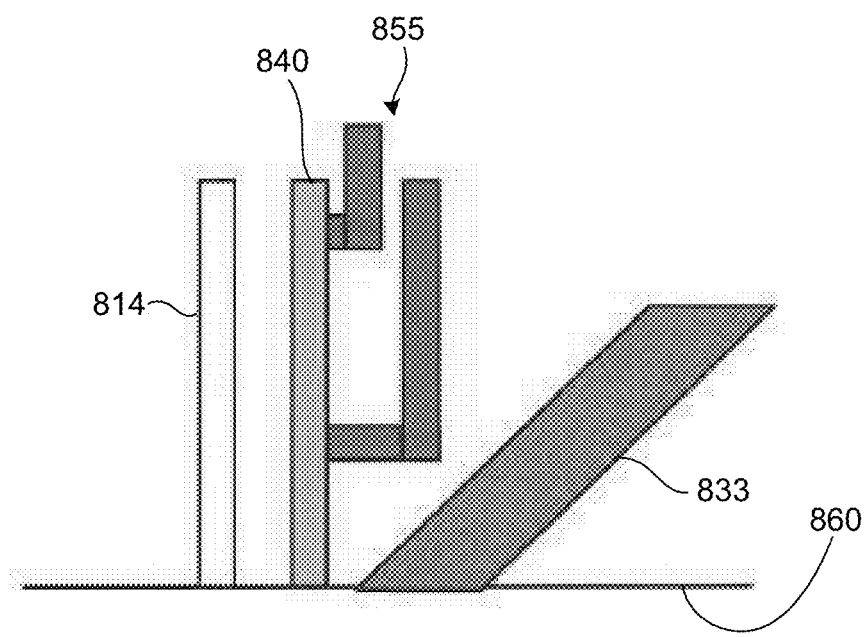

FIG. 8 shows the writer/NFT region at the ABS 860 of a HAMR recording transducer in accordance with various embodiments. In FIG. 8, an NFT 840 is fabricated from or includes TCR material and positioned adjacent a write pole 833. The NFT 840 is a type of NFT referred to as a peg plasmon generator. Unlike the NFT configuration shown in FIG. 7, NFT 840 of FIG. 8 is not connected to a heat sink. A waveguide 814, which is optically coupled to a light source (not shown), is positioned adjacent the NFT 840. A lead arrangement 855, comprising a pair of leads, is connected directly to the NFT 840. The peg region of the NFT 840 shown in FIG. 8 is significantly longer than that of NFT 740 illustrated in FIG. 7. The extensive peg length of the NFT 840 (e.g., relative to that of a lollipop-type NFT 740) provides sufficient room for large leads 855 that can connect directly to the NFT 840. As was discussed previously, the leads of the lead arrangement 855 can be formed from low-, near zero-, or zero-TCR material.

Figure 9:
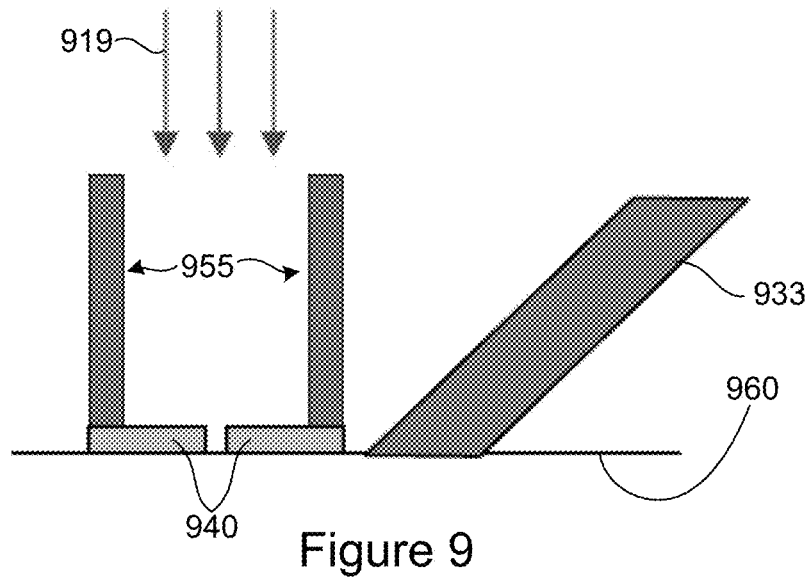

FIG. 9 shows the writer/NFT region at the ABS 960 of a HAMR recording transducer in accordance with various embodiments. The NFT 940 shown in FIG. 9 is referred to as an aperture-like NFT, and is positioned in the light path 919. The NFT 940 is fabricated from or includes TCR material and positioned adjacent a write pole 933. A lead arrangement 955, comprising a pair of leads, is connected to the NFT 940, with one lead 955 coupled to one of the NFT segments 940. As previously discussed, the leads of the lead arrangement 955 can be formed from low-, near zero-, or zero-TCR material.

Figure 10:
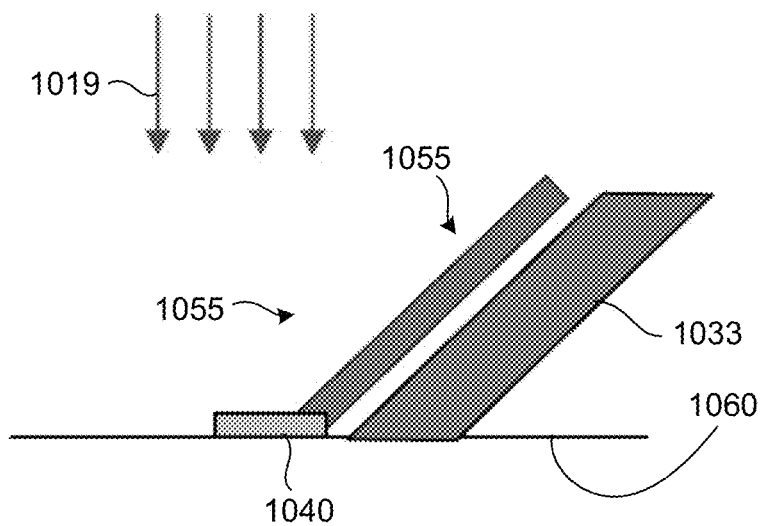

FIG. 10 illustrates the writer/NFT region at the ABS 1060 of a HAMR recording transducer in accordance with various embodiments. The NFT 1040 shown in FIG. 10 is an antenna-like NFT built so that the NFT 1040 is not in the plane of light delivery 1019. The NFT 1040 is fabricated from or includes TCR material and positioned adjacent a write pole 1033. A lead arrangement 1055, comprising a pair of leads, is connected to the NFT 1040, with the lead arrangement 1055 extending substantially parallel with respect to the write pole 1033. The leads of the lead arrangement 1055 can be formed from low-, near zero-, or zero-TCR material.

Figure 11:
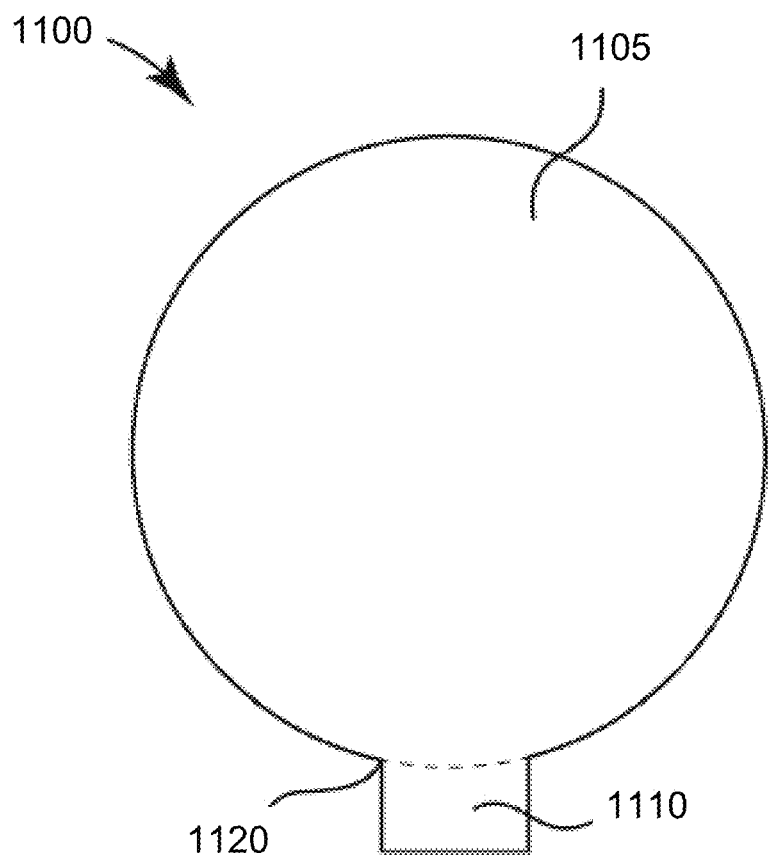

FIG. 11 illustrates an NFT configuration referred to as a lollipop-type NFT in accordance with embodiments of the disclosure. The NFT 1100 illustrated in FIG. 11 has an enlarged disk region 1105 in contact with a peg region 1110. The point where the enlarged disk region 1105 contacts the peg region 1110 is referred to as a break point 1120. The dimensions of the lollipop NFT 1100 are selected to function as an antenna for the incident light, to resonate at the excitation wavelength, and to transfer energy into the peg 1110 and thus to the medium via a feedgap (not shown) at tip of NFT 1100.

According to various embodiment, a multi-purpose NFT that serves as both a near-field transducer for HAMR recording and a temperature sensor can be used to assess and monitor NFT coupling to a light source, such as a laser diode. Assessing and monitoring NFT coupling to the light source can be used for a variety of purposes, such as during an alignment procedure and for monitoring laser power during operation, among others. During NFT/light source alignment, for example, the light source can be positionally adjusted in order to properly align the light source with a waveguide of the recording transducer. The position of the light source can be moved with high precision in order to properly align the light source and the waveguide of the transducer. It can be appreciated that proper alignment between the light source and the waveguide provides for efficient transmission of optical power from the light source to the NFT via the waveguide. It is noted that the procedure of positionally aligning the light source and transducer occurs during manufacture of the apparatus.

According to various embodiments, the NFT is used as a thermal sensor to measure the intensity of laser optical power transmitted through the optical path between the light source and NFT via the waveguide. Because the NFT is positioned immediately adjacent the optical path, changes in resistance of the NFT (or heat sink) sensor accurately reflect corresponding changes in optical power of light transmitted along the optical path between the light source and the NFT. An output signal of the NFT can be used to ensure proper alignment between the light source and the optical components of the transducer. For example, a peak amplitude of the NFT sensor signal can be detected and monitored while the position of light source is being moved during an alignment procedure. The amplitude of the NFT sensor signal will increase and decrease as the position of the light source moves into and out of proper alignment, respectively. When a threshold (e.g., maximum) NFT sensor signal amplitude is reached, proper (e.g., optimal) alignment between the light source and transducer has been achieved.

It is to be understood that even though numerous characteristics of various embodiments have been set forth in the foregoing description, together with details of the structure and function of various embodiments, this detailed description is illustrative only, and changes may be made in detail, especially in matters of structure and arrangements of parts illustrated by the various embodiments to the full extent indicated by the broad general meaning of the terms in which the appended claims are expressed.

What is claimed is:

1. An apparatus, comprising:
   a writer;
   a plasmonic near-field transducer (NFT) adjacent the writer, the NFT comprising an elongated peg member and a material having a temperature coefficient of resistance (TCR); and
   a lead arrangement comprising at least a pair of leads electrically connected to the elongated peg member of the NFT.

2. The apparatus of claim 1, further comprising:
   a heat sink connected to the NFT.

3. The apparatus of claim 2, wherein the heat sink comprises a material having a temperature coefficient of resistance.

4. The apparatus of claim 1, wherein the TCR material of the NFT supports surface plasmons.

5. The apparatus of claim 1, wherein the entirety of the NFT is fabricated from the TCR material.

6. The apparatus of claim 1, wherein:
   the TCR material comprises a first metal that supports surface plasmons; and
   the lead arrangement comprises a second metal different from the first metal.

7. The apparatus of claim 1, wherein the lead arrangement comprises at least a pair of leads formed of an electrically conductive material having a low, near-zero or zero TCR relative to that of the NFT.

8. The apparatus of claim 1, wherein the lead arrangement comprises at least a pair of leads formed of NiCu or NiCr.

9. The apparatus of claim 1, wherein the lead arrangement is configured to communicate a signal that varies in response to a change in temperature of the NFT.

10. The apparatus of claim 1, wherein:
    the NFT comprises:
        an enlarged region in contact with the elongated peg member;
        and
    the apparatus further comprises a heat sink region in thermal contact with the enlarged region and the elongated peg member.

11. An apparatus, comprising:
a writer of a transducer configured to magnetically interact with a magnetic recording medium;
a plasmonic near-field transducer (NFT) adjacent the writer, the NFT comprising an elongate peg member and a material having a temperature coefficient of resistance (TCR); and
a lead arrangement comprising at least a pair of leads connected to the elongate peg member of the NFT, wherein a signal developed at the lead arrangement comprises a component that varies in relation to a change in spacing between the transducer and the medium.

12. An apparatus, comprising:
a slider;
a writer on the slider;
a plasmonic near-field transducer (NFT) comprising an elongated peg member, the NFT having a temperature coefficient of resistance (TCR) and provided on the slider adjacent to the writer, the NFT configured to produce a signal indicative of temperature at the NFT; and
circuitry comprising at least a pair of leads electrically connected to the elongated peg member of the NFT.

13. The apparatus of claim 12, wherein the NFT is configured to produce a signal indicative of one or both of a change in spacing and contact between the slider and a magnetic recording medium.

14. The apparatus of claim 12, wherein the circuitry is configured to detect a change in NFT operating temperature over time using the signal indicative of temperature at the NFT.

15. A method, comprising:
directly sensing with at least a pair of leads a temperature at a slider from either a plasmonic near-field transducer (NFT) or a heat sink connected to the NFT, the NFT comprising either: (a) an elongated peg member, wherein the pair of leads are connected to the peg member; or (b) an enlarged region in contact with a peg region, wherein the pair of leads are connected to the heat sink; and
performing a predetermined action in response to the sensed temperature.

16. The method of claim 15, wherein performing the predetermined action comprises measuring a change in the sensed temperature indicative of a change in spacing between the slider and a magnetic recording medium.

17. The method of claim 15, wherein performing the predetermined action comprises measuring a change in the sensed temperature indicative of contact between the slider and a magnetic recording medium.

18. The method of claim 15, wherein performing the predetermined action comprises measuring intensity of optical power of light transmitted through an optical path between a light source and the near-field transducer.

19. An apparatus, comprising:
a writer;
a plasmonic near-field transducer (NFT) adjacent the writer, the NFT comprising an enlarged region and a peg in contact with the enlarged region, and the NFT comprising a material having a temperature coefficient of resistance (TCR);
a heat sink region in thermal contact with the enlarged region and the peg region; and
a lead arrangement electrically coupled to the NFT, the lead arrangement comprising a least a pair of leads connected to the heat sink region.

20. The apparatus of claim 19, wherein the entirety of the NFT is fabricated from the TCR material.

21. The apparatus of claim 19, wherein:
the TCR material comprises a first metal that supports surface plasmons; and
the lead arrangement comprises a second metal different from the first metal.

22. The apparatus of claim 19, wherein the lead arrangement comprises at least a pair of leads formed of an electrically conductive material having a low, near-zero or zero TCR relative to that of the NFT.

* * * * *